United States Patent
Nishikawa et al.

(10) Patent No.: US 10,686,364 B2
(45) Date of Patent: Jun. 16, 2020

(54) POWER CONVERSION DEVICE WITH PROTECTIVE OPERATION

(71) Applicant: MITSUBISHI ELECTRIC CORPORATION, Chiyoda-ku, Tokyo (JP)

(72) Inventors: Katsuya Nishikawa, Tokyo (JP); Keitaro Yasumori, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/751,181

(22) PCT Filed: Aug. 19, 2015

(86) PCT No.: PCT/JP2015/073235
§ 371 (c)(1),
(2) Date: Feb. 8, 2018

(87) PCT Pub. No.: WO2017/029723
PCT Pub. Date: Feb. 23, 2017

(65) Prior Publication Data
US 2018/0241197 A1    Aug. 23, 2018

(51) Int. Cl.
*H02M 1/32* (2007.01)
*H02M 5/45* (2006.01)
(Continued)

(52) U.S. Cl.
CPC ............ *H02M 1/32* (2013.01); *H02H 7/1216* (2013.01); *H02M 5/45* (2013.01); *H02M 5/4585* (2013.01);
(Continued)

(58) Field of Classification Search
CPC .......... H02H 3/12; H02H 3/42; H02H 7/1213; H02H 1/0007; H02H 7/1216; H02M 1/36;
(Continued)

(56) References Cited

U.S. PATENT DOCUMENTS

| 2010/0007998 | A1* | 1/2010 | Dishman | ............... H02H 3/42 361/18 |
| 2010/0174417 | A1* | 7/2010 | Iida | ................... H01M 10/425 700/292 |

(Continued)

FOREIGN PATENT DOCUMENTS

| EP | 2555368 A1 | 2/2013 |
| JP | S62-077872 A | 4/1987 |

(Continued)

OTHER PUBLICATIONS

Notification of Reasons for Refusal for Japanese Patent Application No. 2017-535189, dated Oct. 24, 2017.
(Continued)

*Primary Examiner* — Fred E Finch, III
*Assistant Examiner* — Rafael O. De León Domenech
(74) *Attorney, Agent, or Firm* — Buchanan Ingersoll & Rooney PC

(57) ABSTRACT

A power conversion device includes a power conversion unit to convert an input power into an output power, a regular controller to perform control of the power conversion unit, and a protective controller to perform protective operation of the power conversion unit. The regular controller, on the basis of current command value in accordance with a target value of an output of the power conversion unit and an output current of the power conversion unit, for example, outputs a control signal to control on-off switching of switching elements included in the power conversion unit. When at least one value corresponding to the output power
(Continued)

of the power conversion unit is not within the target power range determined in accordance with the target value of the output, the protective controller stops the power conversion by the power conversion unit.

2 Claims, 4 Drawing Sheets

(51) Int. Cl.
*H02M 5/458* (2006.01)
*H02H 7/12* (2006.01)
*H02P 29/024* (2016.01)
*H02P 27/06* (2006.01)
*H02H 1/00* (2006.01)

(52) U.S. Cl.
CPC ............ *H02P 27/06* (2013.01); *H02P 29/024* (2013.01); *H02H 1/0007* (2013.01)

(58) Field of Classification Search
CPC ............ H02M 5/42; H02M 1/32; H02M 5/45; H02M 5/4585; H02P 27/06; H02P 29/04
See application file for complete search history.

(56) References Cited

U.S. PATENT DOCUMENTS

| | | | |
|---|---|---|---|
| 2015/0097429 A1* | 4/2015 | Takenaka | H02J 7/35 307/22 |
| 2018/0026546 A1* | 1/2018 | Iisaka | H02M 3/28 320/140 |

FOREIGN PATENT DOCUMENTS

| JP | S63-011001 A | 1/1988 |
|---|---|---|
| JP | 2002-252995 A | 9/2002 |
| JP | 2003-111500 A | 4/2003 |
| JP | 2003-189631 A | 7/2003 |
| JP | 2005-287214 A | 10/2005 |
| JP | 2009-261138 A | 11/2009 |
| JP | 2011-166989 A | 8/2011 |
| JP | 2015-100883 A | 6/2015 |

OTHER PUBLICATIONS

International Search Report (PCT/ISA/210) dated Nov. 17, 2015, by the Japanese Patent Office as the International Searching Authority for International Application No. PCT/JP2015/073235.
Written Opinion (PCT/ISA/237) dated Nov. 17, 2015, by the Japanese Patent Office as the International Searching Authority for International Application No. PCT/JP2015/073235.
Extended European Search Report dated Mar. 8, 2019, issued by the European Patent Office in corresponding European Application No. 15901705.2. (7 pages).
Office Action issued by the Chinese Patent Office in corresponding Chinese Patent Application No. 201580082288.4 dated May 13, 2019 (10 pages including partial English translation).
Office Action issued by the Chinese Patent Office in corresponding Chinese Patent Application No. 201580082288.4 dated Dec. 27, 2019 (7 pages including partial English translation).
Office Action issued by the European Patent in corresponding European Patent Application No. 15901705.2 dated Mar. 4, 2020 (7 pages).

* cited by examiner

POWER CONVERSION DEVICE WITH PROTECTIVE OPERATION

TECHNICAL FIELD

The present disclosure relates to a power conversion device that performs a protective operation with respect to a power conversion unit on the basis of at least one value corresponding to an output power of the power conversion unit.

BACKGROUND ART

A power conversion device is mounted in an electric railway vehicle, converts power acquired from an overhead line, and supplies the converted power to an electric motor. The power conversion device, in response to, for example, an output voltage or an output current, performs operations such as control or protective stoppage of the power conversion unit. The power conversion device disclosed in Patent Literature 1 calculates a generated torque of an AC motor on the basis of two-axis current components calculated from an instantaneous current of an inverter output. This power conversion device detects a pulse component associated with a rectification current of the converter that is included in the generated torque, and adjusts a frequency of the AC output of the inverter on the basis of the pulse component.

CITATION LIST

Patent Literature

Patent Literature 1: Unexamined Japanese Patent Application Kokai Publication No. 2003-111500

SUMMARY OF INVENTION

Technical Problem

The power conversion device disclosed in Patent Literature 1 performs feedback control on the basis of the output current. Although the output current is controlled so as to approach a command value, when a malfunction occurs, such as when the output current becomes an overcurrent, a protective operation is performed to stop power conversion by the power conversion device in order to protect electronic devices within the power conversion device. In the power conversion device that performs the protective operation in accordance with separate events such as overcurrent, overvoltage, and the like, although the output current matches the command value, due to external disturbance and the like, an output power can occur that is not inside a desired range. In such a case, for example, the power input to a load device connected to the power conversion device may become excessive.

The present disclosure is developed in consideration of the aforementioned circumstances, and an objective of the present disclosure is to enable the protective operation of the power conversion device under more diversified types of conditions.

Solution to Problem

In order to attain the aforementioned objective, the power conversion device of the present disclosure includes:

a power conversion unit to convert an input power into an output power; and a protective controller to stop power conversion by the power conversion unit when at least one value corresponding to the output power of the power conversion unit is not within a target power range determined in accordance with a target value of the output power of the power conversion unit.

The protective controller uses the output power of the power conversion unit as the at least one value corresponding to the output power, and the output power of the power conversion unit is calculated using an output voltage of the power conversion unit, the output voltage being detected by a voltmeter disposed at an output of the power conversion unit.

ADVANTAGEOUS EFFECTS OF INVENTION

According to the present disclosure, the power conversion by the power conversion unit is stopped when the at least one value corresponding to the output power is not within the target power range determined in accordance with the target value of the output, thereby enabling protective operation of the power conversion device under more diversified types of conditions.

DESCRIPTION OF EMBODIMENTS

Figure 1:
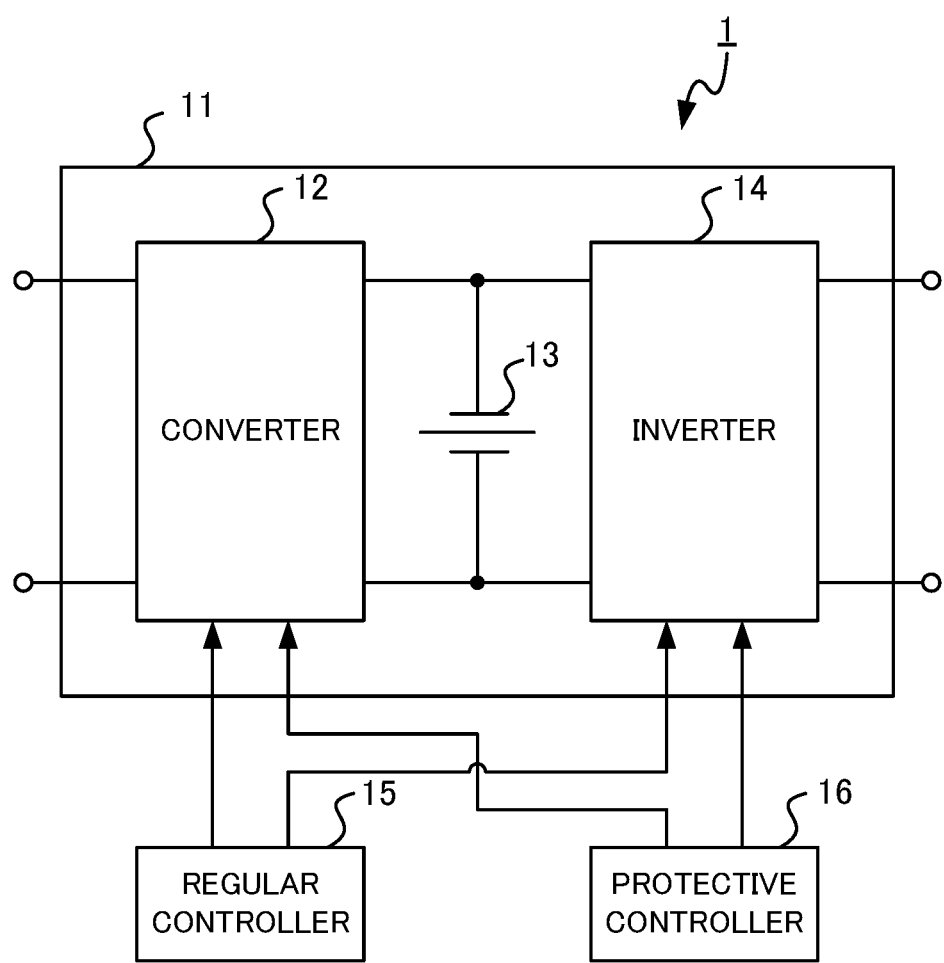
FIG. 1 is a block diagram illustrating an example configuration of a power conversion device according to Embodiment 1 of the present disclosure.

Embodiments of the present disclosure are described below in detail with reference to drawings. In the drawings, components that are the same or equivalent are assigned the same reference signs.

Embodiment 1

FIG. 1 is a block diagram illustrating an example configuration of a power conversion device according to Embodiment 1 of the present disclosure. A power conversion device 1 is mounted in an electric railway vehicle, referred to hereinafter as an electric vehicle. The power conversion device 1 includes:

a power conversion unit 11 that converts an input power into an output power;

a regular controller 15 that controls the power conversion unit 11 in accordance with an output current of the power conversion unit 11 as well as operating commands acquired, for example, from an operator's cab of the electric vehicle; and a protective controller 16 that stops the power conversion by the power conversion unit 11 when an output power of the power conversion unit 11 is not within a target power range.

The target power range is determined in accordance with a target value of the output power of the power conversion unit 11. In the example of FIG. 1, the power conversion unit 11 includes a converter 12 that converts alternating-current (AC) power into direct-current (DC) power and outputs the DC power, a filter capacitor 13, and an inverter 14 that converts the output power of the converter 12 smoothed by the filter capacitor 13 into AC power and outputs the AC power. The power conversion unit 11 may have a circuit configuration that performs unidirectional power conversion or may have a circuit configuration that performs bidirectional power conversion. The configuration of the power conversion unit 11 is not limited to the example of FIG. 1, and for example, a direct-current-to-direct-current converter (DC-DC converter) may be used as the power conversion unit 11.

Figure 2:
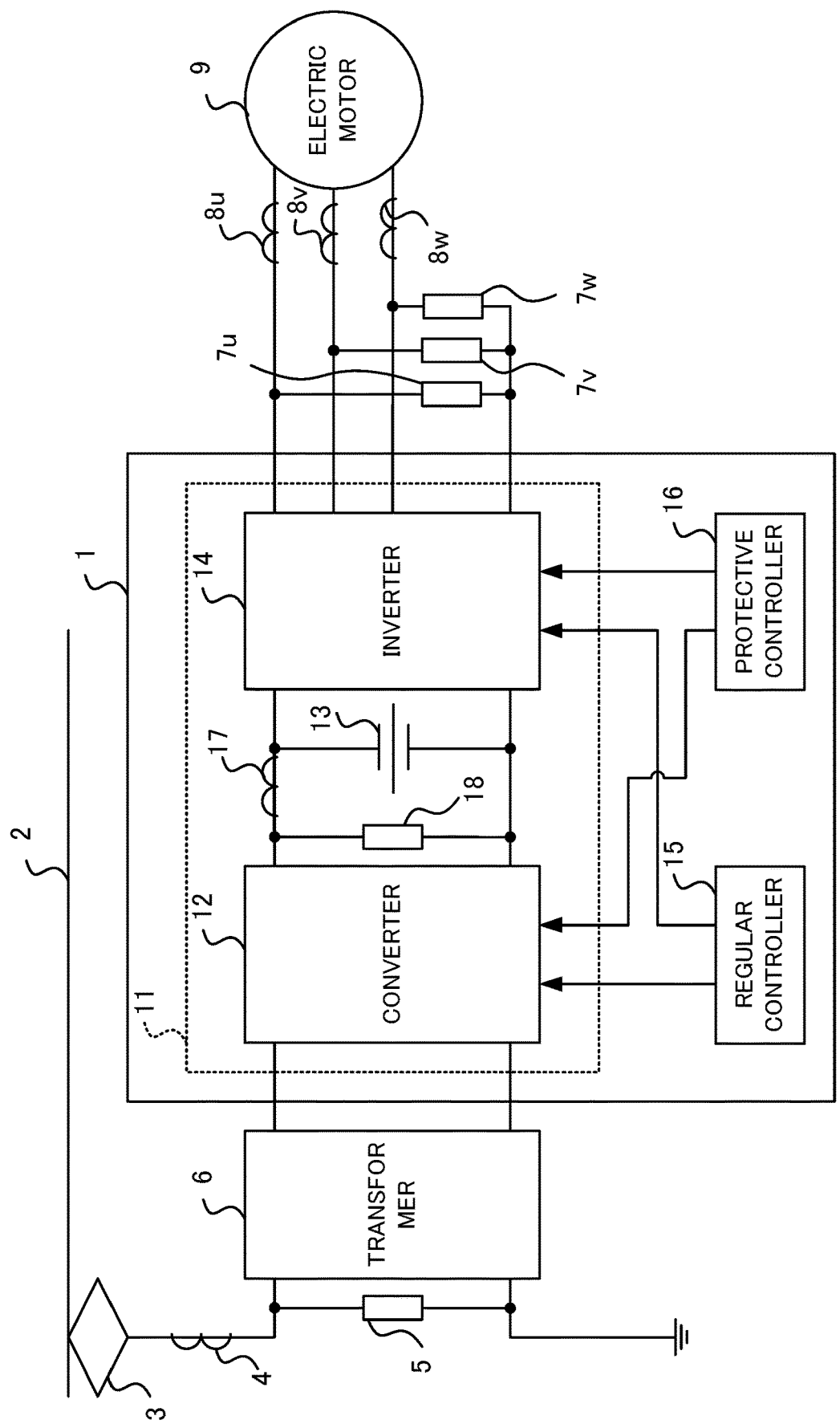
FIG. 2 is a diagram illustrating an example of mounting the power conversion device according to Embodiment 1 on an electric railway vehicle.

FIG. 2 is a diagram illustrating an example of mounting the power conversion device according to Embodiment 1 on an electric railway vehicle. Power is acquired from an overhead line 2 via a power collector 3 such as a pantograph, and the power is converted by a transformer 6 and then supplied to the converter 12. Although FIG. 2 is an example in which an overhead line voltage is an AC voltage, the power conversion device 1 can be mounted in an electric vehicle that travels through areas where the overhead line voltage is a DC voltage. The power converted by the power conversion unit 11 is supplied to an electric motor 9, the electric motor 9 runs, and the electric vehicle is propelled. In the example of FIG. 2, an input power of the power conversion unit 11 is taken to be the power supplied from the overhead line 2 via the power collector 3 and the transformer 6 and supplied to the power conversion unit 11, and the output power of the power conversion unit 11 is taken to be the power output of the power conversion unit 11 to the electric motor 9.

The example illustrated in FIG. 2 includes: an ammeter 4 that detects a primary current; a voltmeter 5 that detects an overhead line voltage; an ammeter 17 that detects a current flowing from the converter 12 to the inverter 14; a voltmeter 18 that detects a voltage of the filter capacitor 13; voltmeters 7u, 7v, and 7w that detect respective voltages of a U phase, V phase, and W phase output by the inverter 14; and ammeters 8u, 8v, and 8w that detect respective currents of the U phase, V phase, and W phase output by the inverter 14. Some of the ammeters 4, 8u, 8v, 8w, and 17 and the voltmeters 5, 7u, 7v, 7w, and 18 may be omitted, and such components may be provided as required in accordance with control performed by the regular controller 15 and the protective controller 16.

The regular controller 15, in accordance with current values detected by the ammeters 8u, 8v, and 8w and a current command value in accordance with a target torque value calculated from an operating command acquired from the operator's cab, for example, outputs to the converter 12 and the inverter 14 control signals that control on-off switching of switching elements included in the converter 12 and the inverter 14.

Figure 3:
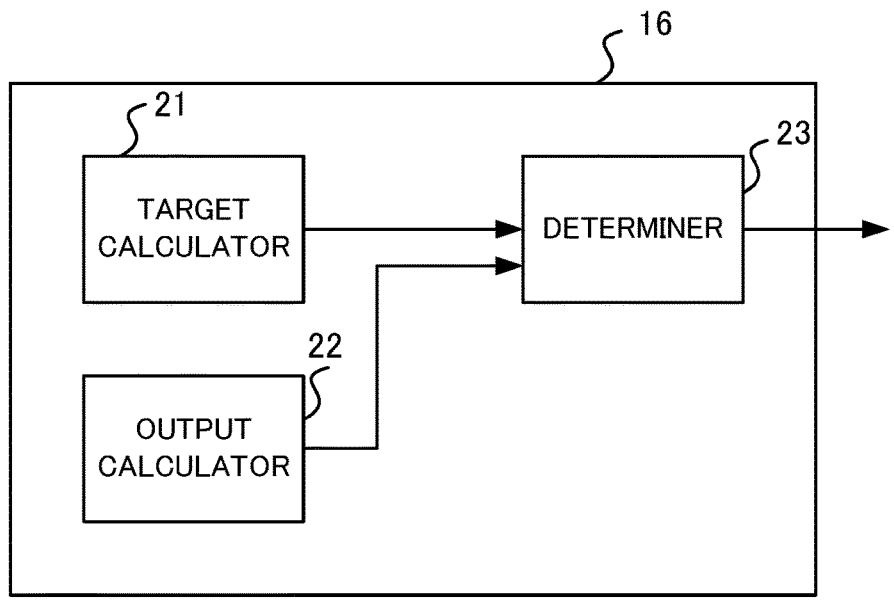
FIG. 3 is a block diagram illustrating an example configuration of a protective controller according to Embodiment 1.

FIG. 3 is a block diagram illustrating an example configuration of the protective controller according to Embodiment 1. The protective controller 16 includes a target calculator 21 that calculates the target power range, an output calculator 22 that calculates at least one value corresponding to the output power of the power conversion unit 11, and a determiner 23 that determines, on the basis of the target power range and the at least one value corresponding to the output power, whether to stop the power conversion by the power conversion unit 11 and that controls the power conversion unit 11 in accordance with the determination result.

The target calculator 21 calculates: a target power value, which is the target value of the output of the power conversion unit 11 to the electric motor 9, from a product of the target torque value calculated from the operating command and a frequency acquired from a non-illustrated frequency detector that detects frequency of the electric motor 9; and the target power range in accordance with a permissible range of error from the target power value, for example. The target calculator 21 calculates the target power range in accordance with factors such as a permissible degree of disablement of regenerative braking, for example.

The output calculator 22, for example, calculates instantaneous values of the output power of the power conversion unit 11 from the products of the detection results of the voltmeters 7u, 7v, and 7w and the ammeters 8u, 8v, and 8w, and uses the calculated instantaneous values as the at least one value corresponding to the output power. The output calculator 22, for example, may calculate the instantaneous value of the input power of the power conversion unit 11 from the product of the detection results of the ammeter 4 and the voltmeter 5, and may use the calculated instantaneous value as the at least one value corresponding to the output power. For a power conversion unit 11 that performs highly efficient power conversion, the input power can be treated as the value corresponding to the output power.

In the case in which the at least one value corresponding to the output power is not within the target power range, the determiner 23 makes a determination to stop the power conversion by the power conversion unit 11, and outputs to the converter 12 and the inverter 14 control signals to cause stoppage of operation of the converter 12 and the inverter 14.

According to the power conversion device 1 according to Embodiment 1 of the present disclosure in the aforementioned manner, when the at least one value corresponding to the output power of the power conversion unit 11 is not within the target power range, the power conversion by the power conversion unit 11 is stopped, and thus even in a case, such as due to external disturbance and the like, in which the output power is not within the target power range although the output current of the power conversion unit 11 is within the proper range, the power conversion by the power conversion unit 11 can be stopped, and protective operation of the power conversion device 1 is enabled over more diversified types of conditions. When the output power of the power conversion unit 11 is not within the target power range, the power conversion by the power conversion unit 11 is stopped, thereby enabling improvement of the reliability of control of a vehicle in which the power conversion device 1 is mounted.

Embodiment 2

Figure 4:
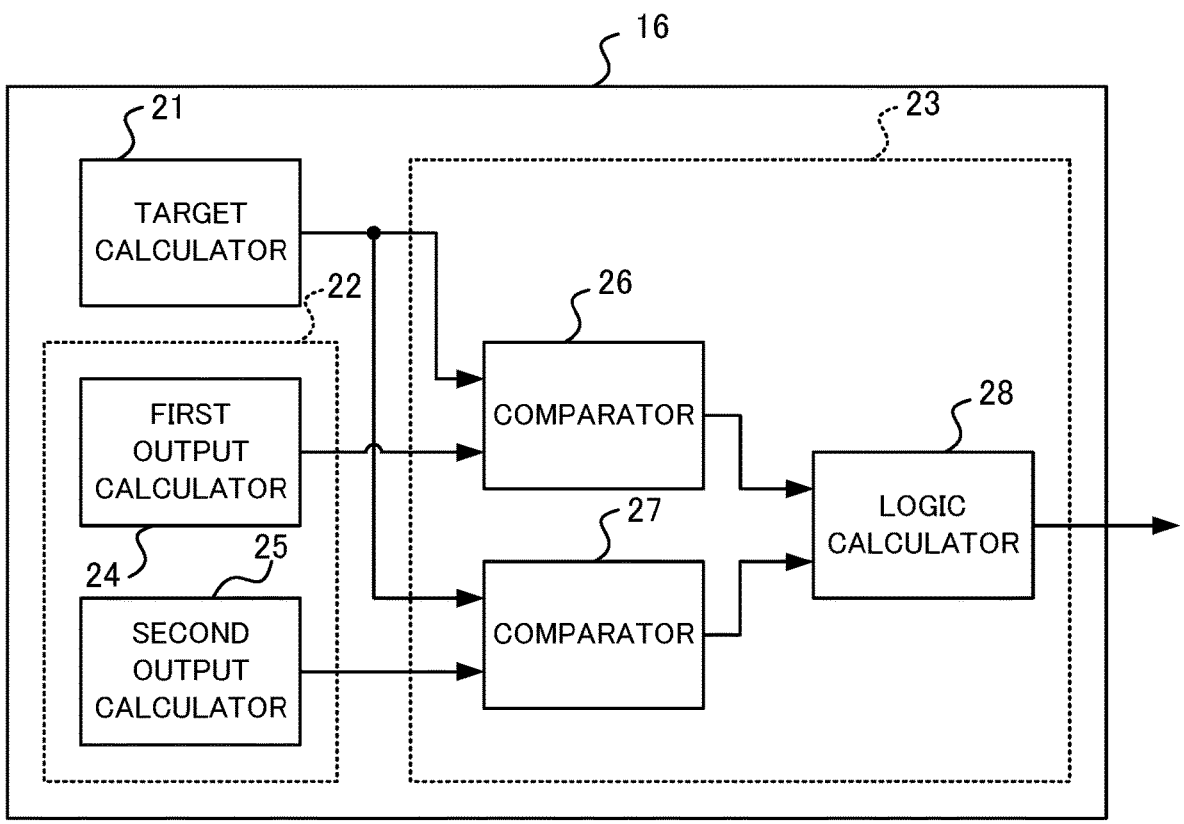
FIG. 4 is a block diagram illustrating an example configuration of a protective controller according to Embodiment 2 of the present disclosure.

Structure of a power conversion device 1 according to Embodiment 2 of the present disclosure is the same as structure of the power conversion device 1 according to Embodiment 1. FIG. 4 is a block diagram illustrating an example configuration of a protective controller according to Embodiment 2 of the present disclosure. The protective controller 16 according to Embodiment 2 includes the target calculator 21, the output calculator 22, and the determiner 23. The protective controller 16 uses two values as the at least one value corresponding to the output power of the power conversion unit 11, and controls the power conversion unit 11 in accordance with the target power range and the two values corresponding to the output power.

The output calculator 22 includes a first output calculator 24 that calculates the output power of the power conversion unit 11 and a second output calculator 25 that calculates the input power of the power conversion unit 11. The determiner 23 includes a comparator 26 that compares a target power range and the output power of the power conversion unit 11, a comparator 27 that compares a target power range and the input power of the power conversion unit 11, and a logic calculator 28 that uses outputs from the comparators 26 and 27 to determine whether to stop the power conversion by the power conversion unit 11 and that controls the power conversion unit 11 in accordance with results of the aforementioned determination. The target power ranges used by the comparators 26 and 27 may be the same as illustrated in FIG. 4, or may be different from each other. For example, in consideration of losses in the power conversion unit 11, different target power ranges may be used by the comparators 26 and 27.

In the same manner as Embodiment 1, the first output calculator 24 calculates the instantaneous value of the output power of the power conversion unit 11 from the product of the detection results of the voltmeters 7u, 7v, and 7w and the ammeters 8u, 8v, and 8w, for example. In the same manner as Embodiment 1, the second output calculator 25 calculates the instantaneous value of the input power of the power conversion unit 11 from the product of the detection results of the ammeter 4 and the voltmeter 5, for example.

The comparator 26 compares the target power range and the output power of the power conversion unit 11 calculated by the first output calculator 24, and the comparator 26 outputs to the logic calculator 28 a signal that is at a low (L) level when the output power of the power conversion unit 11 is within the target power range and is at a high (H) level when the output power of the power conversion unit 11 is not within the target power range.

The comparator 27 compares the target power range and the input power of the power conversion unit 11 calculated by the second output calculator 25, and the comparator 27 outputs to the logic calculator 28 a signal that is at the L level when the input power of the power conversion unit 11 is within the target power range and is at the H level when the input power of the power conversion unit 11 is not within the target power range.

The logic calculator 28 includes an OR circuit, for example, and when either the output of the comparator 26 or the output of the comparator 27 is at the H level, outputs the control signal to stop the power conversion by the power conversion unit 11. Even when a malfunction occurs in any one of the ammeters 4, 8u, 8v, 8w, and the voltmeters 5, 7u, 7v, and 7w, due to stoppage of the power conversion by the power conversion unit 11 when the output of the comparator 26 or 27 is at the H level, detection of the malfunction of the power conversion unit 11 and stoppage of the power conversion by the power conversion unit 11 are enabled.

The logic calculator 28 may include an AND circuit, for example, and may output the control signal to stop the power conversion by the power conversion unit 11 when the outputs of both the comparator 26 and the comparator 27 are at the H level. Due to stoppage of the power conversion by the power conversion unit 11 when both outputs of the comparator 26 and the comparator 27 are at the H level, the stoppage of power conversion by the power conversion unit 11 due to a malfunction in any one of the ammeters 4, 8u, 8v, and 8w, and the voltmeters 5, 7u, 7v, and 7w despite the output of the power conversion unit 11 being normal, can be prevented.

According to the power conversion device 1 according to Embodiment 2 as described above, in the case of the establishment of at least one condition (that is, the condition of the output power of the power conversion unit 11 not being within the target power range, and/or the condition of the input power of the power conversion unit 11 not being within the target power range), the power conversion by the power conversion unit 11 is stopped, and thus protective operation of the power conversion device 1 is enabled under more diversified types of conditions. The use of the two values corresponding to the output power enables performance of reliable protective operation of the power conversion device 1.

Embodiment 3

Figure 5:
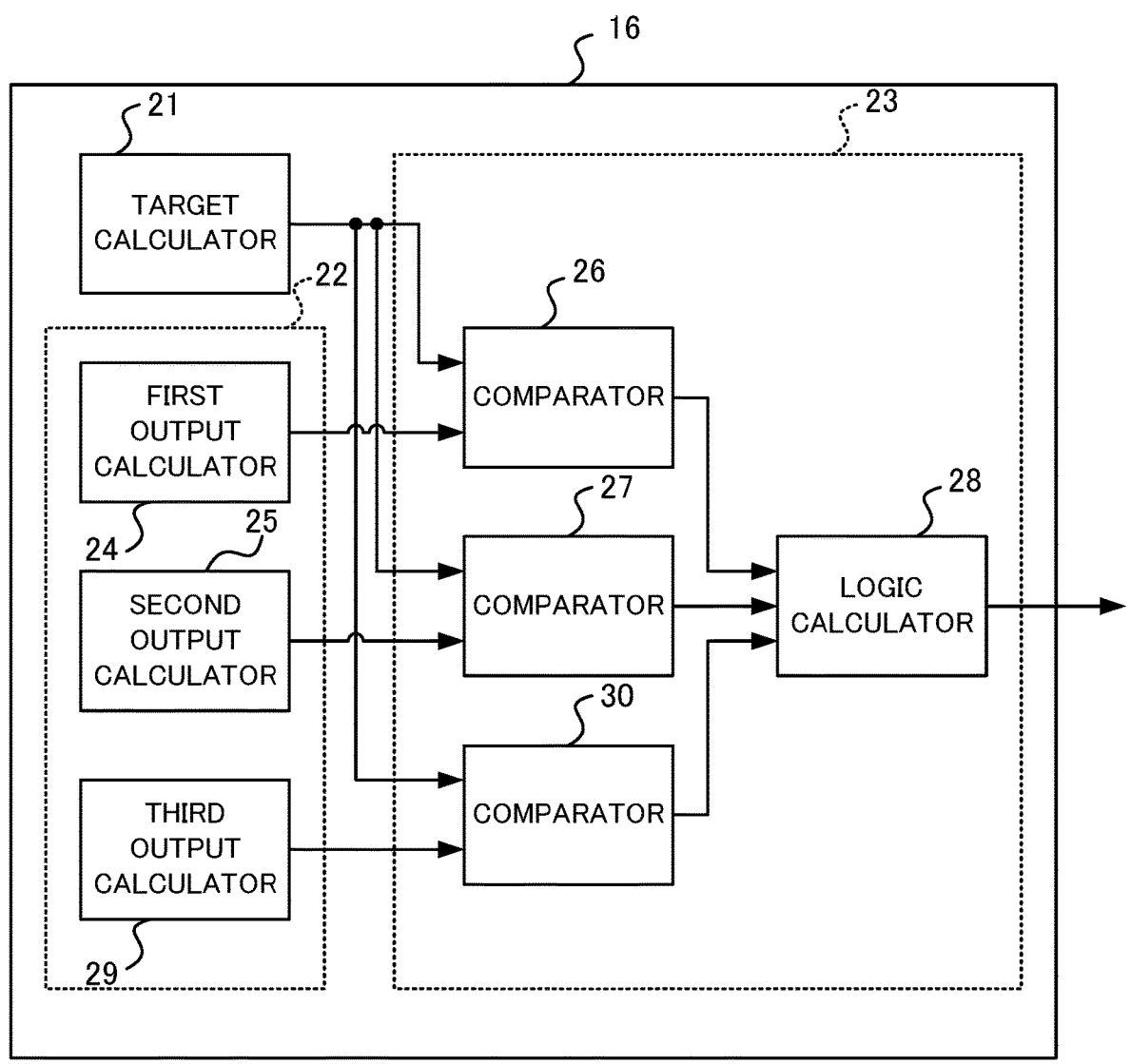
FIG. 5 is a block diagram illustrating an example configuration of a protective controller according to Embodiment 3 of the present disclosure.

Structure of a power conversion device 1 according to Embodiment 3 of the present disclosure is the same as structure of the power conversion device 1 according to Embodiment 1. FIG. 5 is a block diagram illustrating an example configuration of a protective controller according to Embodiment 3 of the present disclosure. The protective controller 16 according to Embodiment 3 includes the target calculator 21, the output calculator 22, and the determiner 23. The protective controller 16 uses three values as the at least one value corresponding to the output power of the power conversion unit 11, and controls the power conversion unit 11 in accordance with the target power ranges and the three values corresponding to the output power.

The output calculator 22 includes a first output calculator 24 that calculates the output power of the power conversion unit 11, a second output calculator 25 that calculates the input power of the power conversion unit 11, and a third output calculator 29 that calculates the input power of the inverter 14 included in the power conversion unit 11. The determiner 23 includes a comparator 26 that compares a target power range and the output power of the power conversion unit 11, a comparator 27 that compares a target power range and the input power of the power conversion unit 11, a comparator 30 that compares the output power of the converter 12 or the input power of the inverter 14 with the target power range, and a logic calculator 28 that uses outputs from the comparators 26, 27, and 30 to determine whether to stop the power conversion by the power conversion unit 11 and that controls the power conversion unit 11 in accordance with results of the aforementioned determination. The target power ranges used by the comparators 26, 27, and 30 may be the same or may be different from each other. For example, in consideration of losses in the power conversion unit 11, different target power ranges may be used by the comparators 26, 27, and 30.

The configurations and operations of the first output calculator 24 and the second output calculator 25 are similar to those in Embodiment 2. The third output calculator 29, for example, calculates an instantaneous value of the input power of the inverter 14 from a product of the detection results of the ammeter 17 and the voltmeter 18.

The configurations and operations of the comparators 26 and 27 are similar to those in Embodiment 2. The comparator 30 compares the target power range and the input power of the inverter 14 calculated by the third output calculator 29, and outputs to the logic calculator 28 a signal that is at the L level when the input power of the inverter 14 is within the target power range, and is at the H level when the input power of the inverter 14 is not within the target power range.

The logic calculator 28 outputs the control signal to stop the power conversion by the power conversion unit 11 when the output of any one of the comparators 26, 27, and 30 is at the H level. Further, the logic calculator 28 may output the control signal to stop the power conversion by the power conversion unit 11 when at least two outputs are at the H level among the outputs of the comparators 26, 27, and 30. Due to stoppage of the power conversion by the power conversion unit 11 when two or more values corresponding to the output power among the three values corresponding to the output power is not within the target power range, the stoppage of power conversion by the power conversion unit 11 by detection of malfunction of the power conversion unit 11 is possible even when a malfunction occurs in any one of the ammeters 4, 8u, 8v, 8w, and 17 and the voltmeters 5, 7u, 7v, 7w, and 18; and the stoppage of power conversion by the power conversion unit 11 due to a malfunction in any one of the ammeters 4, 8u, 8v, 8w, and 17 and the voltmeters 5, 7u, 7v, 7w, and 18, despite the output of the power conversion unit 11 being normal, can be prevented.

In the case as illustrated in FIG. 1 in which the filter capacitor 13 is not included in the power conversion unit 11, two each of both the ammeter 4 and the voltmeter 5 may be included, and the first output calculator 24 may calculate the input power of the power conversion unit 11 from a product of the detection result of one pair of the ammeter 4 and voltmeter 5, and the third output calculator 29 may calculate the input power of the power conversion unit 11 from the product of the detection results of the other pair of the ammeter 4 and the voltmeter 5. Also in this case, the operations of the comparator 30 and the logic calculator 28 are similar to those of the aforementioned examples.

Further, two each of the ammeters 8u, 8v, 8w, and the voltmeters 7u, 7v, and 7w may be included, the second output calculator 25 may calculate the output power of the power conversion unit 11 from the product of the detection results of one each of the pairs of the ammeters 8u, 8v, 8w, and the voltmeters 7u, 7v, and 7w, and the third output calculator 29 may calculate the output power of the power conversion unit 11 from the products of the detection results of the other pairs of the ammeters 8u, 8v, 8w, and the voltmeters 7u, 7v, and 7w. Also in this case, the operations of the comparator 30 and the logic calculator 28 are similar to those of the aforementioned examples.

According to the power conversion device 1 according to Embodiment 3 as described above, the power conversion by the power conversion unit 11 is stopped when at least one of the output power of the power conversion unit 11, the input power of the power conversion unit 11, or the input power of the inverter 14 is not within the target power range, thereby enabling protective operation of the power conversion device 1 under more diversified types of conditions. By the use of the three values corresponding to output power, protective operation of the power conversion device 1 can be performed reliably.

Embodiments of the present disclosure are not limited to the above embodiments. The values corresponding to the output power of the power conversion unit 11 used by the protective controller 16 may be 4 or more values.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Power conversion device
2 Overhead line
3 Power collector
4, 8u, 8v, 8w, 17 Ammeter
5, 7u, 7v, 7w, 18 Voltmeter
6 Transformer
9 Electric motor
11 Power conversion unit
12 Converter
13 Filter capacitor
14 Inverter
15 Regular controller
16 Protective controller
21 Target calculator
22 Output calculator
23 Determiner
24 First output calculator
25 Second output calculator
26, 27, 30 Comparator
28 Logic calculator
29 Third output calculator

The invention claimed is:

1. A power conversion device comprising:
a power conversion unit to convert an input power into an output power; and
a protective controller to stop power conversion by the power conversion unit when, using the output power and the input power of the power conversion unit, both a first condition and a second condition are satisfied,
the first condition being that, the output power of the power conversion unit is not within a first target power range,
the second condition being that the input power of the power conversion unit is not within a second target power range different from the first target power range, wherein the second condition is not satisfied by satisfaction of the first condition,
wherein the output power of the power conversion unit is calculated using an output voltage of the power conversion unit, the output voltage being detected by a voltmeter disposed at an output of the power conversion unit.

2. A power conversion device comprising:
a power conversion unit comprising:
a first power converter to convert input power into an output power; and
a second power converter to, using the output power of the first power converter as an input power, convert the input power into an output power; and
a protective controller to stop power conversion by the power conversion unit when, using the output power of the power conversion unit, the input power of the power conversion unit, and the output power of the first power converter or the input power of the second power converter, a first condition is satisfied and at least one of a second condition or a third condition is satisfied, the first condition being that the output power of the power conversion unit is not within a first target power range, the second condition being that the input power of the power conversion unit is not within a second target power range different from the first target power range, the third condition being that the output power of the first power converter or the input power of the second power converter is not within a third target power range different from the first target power range, wherein the second and third conditions are not satisfied by satisfaction of the first condition, wherein the output power of the power conversion unit is calculated using an output voltage of the power conversion unit, the output voltage being detected by a voltmeter disposed at an output of the power conversion unit.

\* \* \* \* \*